United States Patent [19]
Zscheile, Jr. et al.

[11] 4,429,310
[45] Jan. 31, 1984

[54] RANDOM BINARY WAVEFORM ENCODED RANGING APPARATUS

[75] Inventors: John W. Zscheile, Jr., Farmington; Steven L. Bennett, Salt Lake City, both of Utah

[73] Assignee: Sperry Corporation, New York, N.Y.

[21] Appl. No.: 256,448

[22] Filed: Apr. 22, 1981

[51] Int. Cl.$^3$ .............................................. G01S 13/08
[52] U.S. Cl. ............................. 343/13 R; 343/17.1 R; 343/18 R
[58] Field of Search .......... 343/17.1 PF, 18 E, 17.2 R, 343/12 A, 17.1 R, 13 R, 5 PN; 367/109

[56] References Cited

U.S. PATENT DOCUMENTS 4,142,189 2/1979 Gleason .................. 343/17.2 PC X
4,322,827 3/1982 Weber ............................ 367/109

*Primary Examiner*—Maynard R. Wilbur
*Assistant Examiner*—K. R. Kaiser

*Attorney, Agent, or Firm*—John B. Sowell; Kenneth T. Grace; Marshall M. Truex

[57] ABSTRACT

A ranging apparatus is provided having an encoded waveform signal which is generated by completely random sequence generator without second order statistics so that the waveform signal has a remote statistical probability of being analyzed. The modulated radio frequency waveform is transmitted to an object and the reflected signal is received by the ranging apparatus which comprises a digital solid state read-write memory arranged to have information written into the memory at a fixed frequency and arranged to have the information read out of the solid state read-write memory at a variable frequency to provide the equivalent of a rotating memory. The digital logic employed in the ranging apparatus is extremely accurate and not subject to drift and changes which could occur in analog type systems. The implementation of the ranging apparatus is accomplished with economical commercially available components thus providing an improved digital ranging apparatus.

7 Claims, 4 Drawing Figures

RANDOM BINARY WAVEFORM ENCODED RANGING APPARATUS

BACKGROUND OF THE INVENTION

1. Field of the Invention

This invention is related to ranging apparatus and more particularly relates to apparatus for encoding the ranging signal to prevent decoding of the signal, thus, preventing spoofing and making detection of the source difficult.

2. Description of the Prior Art

Radio frequency altimeters are well known. Most commercial aircraft altimeters employ either pulse modulation or frequency modulation techniques. Both techniques are not covert and are easily detectable, thus, are not suited for military aircraft and missiles. Both systems send out a recognizable feature in the transmitted signal and measure the time required for the return of the recognizable feature. The measured time for the round trip of the signal is an analog of the range.

It has been suggested that a pseudo-noise encoded waveform may be placed on a modulated carrier and transmitted to make the ranging source both difficult to detect and to decode. The recognizable feature is ordinarily recognizable to the source equipment and is usually indistinguishable from the low power spectral density waveform.

Pseudo-noise continuous wave altimeters are possible to intercept, and using sophisticated computer equipment, can be decoded so as to employ electronic countermeasure spoofing equipment and make the range measurements incorrect.

There is a need for an accurate radio frequency altimeter in which the recognizable feature in the encoded waveform has a remote statistical probability of being decipherable and the source of the encoded waveform signals is difficult to detect.

SUMMARY OF THE INVENTION

It is a principle object of the present invention to provide a secure radar ranging apparatus.

It is another object of the present invention to provide a secure and difficult to detect radar altimeter.

It is another principle object of the present invention to provide a ranging apparatus employing cheap, commercially available, highly reliable, digital components.

It is yet another object of the present invention to provide a novel method of making a range count for ranging apparatus.

It is a general object of the present invention to provide novel ranging apparatus which is extremely easy to adapt to various different altitude limited platforms.

According to these and other objects to be explained in greater detail hereinafter, there is provided a novel ranging apparatus having a completely random sequence generator without second order statistics and zero bias employed to modulate a radio frequency waveform which is transmitted and received after being reflecting from an object being ranged. The time required for the round trip of the waveform beam is measured in a digital read-write memory arranged to be written into at a fixed frequency rate and to be read out of at a variable frequency rate.

BRIEF DESCRPTION OF THE DRAWINGS

DESCRIPTION OF THE PREFERRED EMBODIMENT

Figure 1:
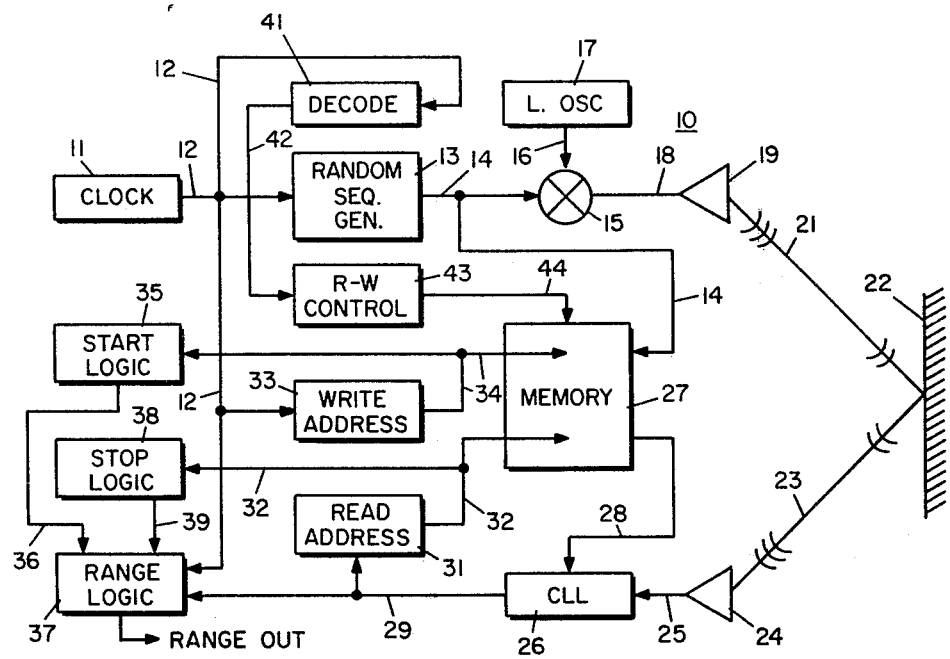
FIG. 1 is a schematic block diagram showing the major elements of the present invention ranging apparatus.

The present invention ranging apparatus 10 is shown in FIG. 1 wherein clock 11 comprises an accurate high frequency clock oscillator which is fixed and stable. The output of clock 11 on line 12 is applied to a random binary sequence generator 13. Such generators are well-known and may generate the signal by developing zero mean gaussian noise through the use of hot resistors, vacuum tubes, or computers. The waveform on line 14 comprises a waveform of binary bits in completely random form such as a non returned to zero (NRZI) waveform. The waveform on line 14 is applied to mixer 15 to modulate the signal on line 16 from local oscillator 17. The output of mixer 15 on line 18 is processed and transmitted via antenna 19. The transmitted signal from antenna 19, shown by signal path 21, is reflected off an object 22 which is being ranged and reflects back on path 23 to the receiving antenna 24. The processed received signal on line 25 is applied to code locked loop 26. The signal on line 25 is the delayed and attenuated transmitted signal from antenna 19.

The binary bits from random sequence generator 13 on line 14 are stored in a predetermind repetitive sequence of addresses in memory 27. This previously stored data in memory 27 is read from memory 27 and appears on line 28 as an input to code locked loop 26 to produce a variable frequency clock signal on line 29.

The variable frequency clock signal on line 29 is applied to read address logic 31. The sequence of addresses on line 32 from read address logic 31 is applied as a read address pointer to memory 27 to identify the data being read out of memory 27 on line 28.

The information being read out of memory 27 was previously written into memory 27 via line 14 at the addresses identified by the write address logic 33 via line 34. The addresses on line 32 point to the same sequence of addresses as the addresses on line 34, but are delayed in time therefrom as will be explained in greater detail hereinafter. The sequence of addresses generated by write address logic 33 are being sequentially advanced by the fixed frequency clock 11 via line 12.

When a range computation is being made, a unique predetermined write address, generated on line 34, is recognized by start logic 35 to generate a start signal on line 36 which is applied to range logic 37. When the same unique predetermined address is generated by the read address logic 31 on line 32, it is recognized by stop logic 38 and generates a stop signal on line 39 which is applied to the range logic 37. The time difference between the start signal and the stop signal is an analog in direct proportion to the range distance from the system 10 to the object 22.

The decode logic 41 is stepped by the clock input on line 12 to produce an alternating read-write enable signal on line 42. The enable signal on line 42 is processed by read-write control logic 43 and determines via line 44 which of the address pointers 34 or 32 are enabled. It will be understood that this output from read-write control logic 43 on line 44 also determines whether the write function or the read function in memory will be performed.

The novel mode of operation of the present system may be better explained by analogy wherein the solid state random access memory 27 is the equivalent of a rotating lazy susan memory. The data being placed in memory 27 at one fixed position via line 14 is being taken out at a later time at a variable position via line 28. The distance between the memory address positions (or points on the lazy susan) is a measure of the range when the system is locked onto target. As the distance between the object or target 22 and the system 10 is increased, the angular separation (or time) between the fixed position at line 14 on the rotating memory and the variable position at line 28 is also increased.

The maximum range distance that can be measured is reached when the angular position separation between lines 14 and 28 employs all of the memory positions of memory 27. Thus, it will be understood that maximum range of the system 10 is only limited by the size of the memory 27.

Figure 2:
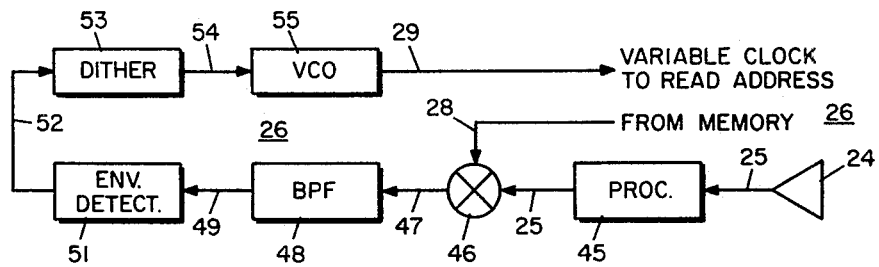
FIG. 2 is a detailed block diagram of a typical preferred code locked loop employed in the apparatus of FIG. 1.

Refer now to FIG. 2 showing in greater detail a typical or preferred code locked loop 26. The signal on line 25 from receiving antenna 24 is first processed in a signal processor 45 before preceeding on line 25 to mixer 46. The signals on line 25 and 28 are being correlated in mixer 46 to provide an output on line 47 which is applied to bandpass filter 48. The output of bandpass filter 48 on line 49 is a signal at carrier frequency whose amplitude is indicative of the degree of correlation between the signals on lines 25 and 28. When the two signals are locked on, the amplitude of the output signal on line 49 is at a maximum and is easily detected. Envelope detector 51 removes the carrier signal and provides a carrier envelope signal on line 52 which is applied to the dither logic 53.

Dither logic 53 provides an analog voltage signal on line 54 which directs the voltage controlled oscillator 55 to increase or decrease the frequency. The variable output frequency on line 29 allows data to be read out of memory 27 on line 28 such that it maintains the exact alignment or synchronism with the data on line 25.

Figure 4:
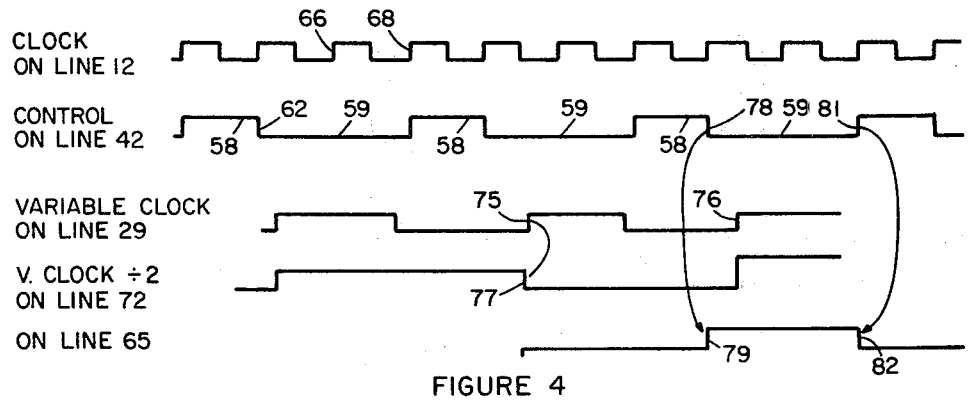
FIG. 4 is a waveform diagram adapted to explain the timing of the control signals and data flow.
Figure 3:
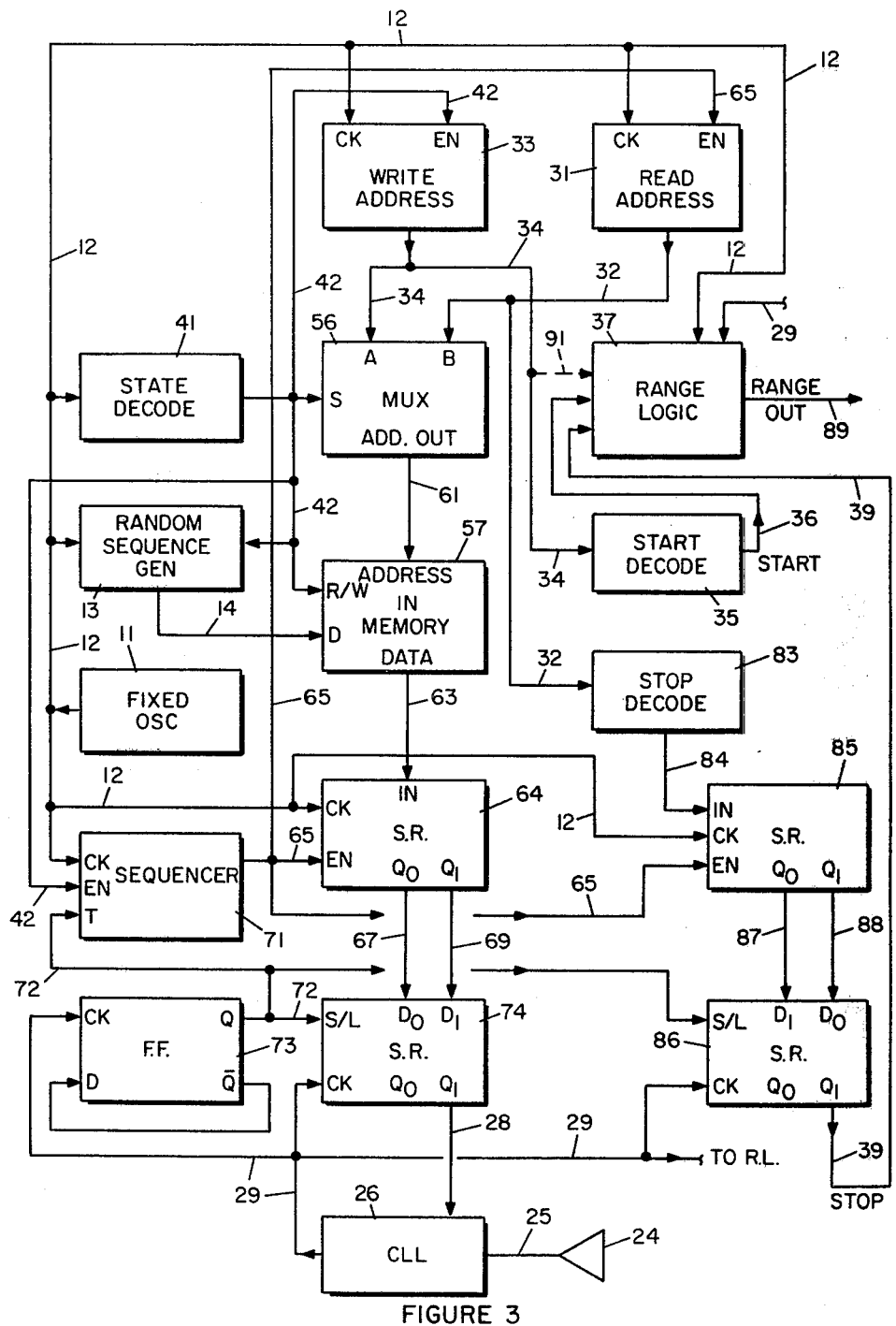
FIG. 3 is a detailed schematic block diagram showing the functional block which is comprised of commercially available elements.

Refer now to FIGS. 3 and 4. FIG. 3 shows in greater detail the operation of the novel rotating memory 27 which now comprises a multiplexer 56 and a random access memory (RAM) chip 57. RAM chip 57 has only one set of address inputs for either read or write. The control of read or write is determined by a signal on read-write control line 42 which is applied to the read/write input of chip 57.

Assume that the write enable signals 58 are high for writing as shown in FIG. 4 and that the read enable signals 59 are represented by the low portion of the waveform on line 42. When line 42 is high to enable writing, it also enables write address logic 33 and selects the A input of the multiplexer (MUX) 56 such that the present write address on line 34 is presented on output line 61 of MUX 56. This condition allows the data on line 14 to be written into memory 57 at the address location designated by the address on line 61. Only one address is presented on line 61 during the write signal 58. When signal 58 goes low as shown at the transition point 62, the write address is sequenced one count by its clock 12 input and then disabled. Now the signal 59 on line 42 is in the low state and the memory 57 is in the read state. Line 42 is low and selects the B input of MUX 56 so that the address on line 32 is presented to the memory 57 via line 61.

The data stored in memory 57, as designated by the address on line 61, is presented on memory output line 63 to shift register 64. Assume that the line 65 is active and high to enable shift register 64 and read address logic 31. When the next transition point 66 of the clock 11 on line 12 occurs, the output of memory 57 on line 63 is clocked into shift register 64 and appears at the Q0 output of shift register 64 on line 67. The clock transition 66 on line 12 at read address logic 31 advances the address one sequential count so that the new address on line 32 is now presented to memory 57 on line 61. The data in memory 57 designated by the address on line 61 is now presented on memory output line 63.

The next clock transition point 68 on line 12 at shift register 64 now shifts the data on line 67 to the Q1 output on line 69. The same clock transition point 68 shifts the data on line 63 from memory 57 to shift register 64 and is presented on the Q0 output line 67. The clock transition point 68 also appears at read address logic 31 and sequences the address count on line 32. Further, the clock transition 68 causes sequencer 71 to change the output on line 65 from a high to a low condition.

Assuming that the Q output on line 72 of flip-flop 73 is high, it causes shift register 74 to be in the load mode and the data on lines 67 and 69 will be loaded into shift register 74 when the next variable clock transition 75 appears on line 29. Then the data loaded into shift register 74 from line 69 will also appear as an output on line 28 to code locked loop 26. The transition 75 on line 29 which loaded shift register 74 also appears at the clock input of flip-flop 73 which causes the Q output on line 72 to go from the high to the low condition.

The next variable clock transition point 76 on line 29 causes the data stored in the Q0 position of shift register 74 to be shifted to the Q1 position and now appears on line 28. The same transition 76 also appears at the clock input of flip-flop 73 and causes the Q output on line 72 to go high, thus, completing one load and shift cycle. It will now be understood that the data stored in the addresses of memory 57 designated by the read address 31 may be retrieved and presented on line 28 at a rate determined by the variable frequency clock on line 29. The high to low transition of the Q output of flip-flop 73 on line 72 occurs at every other variable frequency clock pulse because flip-flop 73 acts as a divide by two logic element.

The high to low trigger 77 on line 72 is applied to the trigger input of sequencer 71 to indicate to sequencer 71 that two bits of data from RAM 57 have been accepted by shift register 74. After transition signal 75 is applied to sequencer 71, the logic of sequencer 71 awaits the next following high to low transition 78 of signal 58 which causes sequencer 71 to go from a high to a low state as shown by the transition 79 on line 65. The next following low to high transition 81 of signal 58 causes sequencer 71 to go from high to low as shown by the transition 82 on line 65.

Memory 57 in its commercial form is not an asynchronous memory, but the memory 57 when coupled with the elements which control shift registers 64 and 74 permit asynchronous read-write operation of the system.

The fixed oscillator 11, the random sequence generator 13 and state decode logic 41 operate in the same manner as explained hereinbefore with regards to FIG. 1.

In the preferred mode of operation, data is being written into memory 57 at a fixed rate. The addresses are also being supplied at line 34 via write address logic 33 at a fixed rate. When a predetermined unique address, which has been designated as a start epoch, appears on line 34 it generates a start signal from start decoder logic 35 on line 36. The start signal starts the range logic 37.

When the same predetermined address is generated by read address logic 31 on line 32, it generates a stop pulse on line 84 which is applied to shift register 85. The shift register 85 is enabled and clocked by the same signals which clock and enable shift register 64 on lines 12 and 65.

In a similar manner two bit shift register 86 is loaded via lines 87 and 88 in the same way lines 67 and 69 loaded shift register 74. Thus, the stop signal on line 39 from shift register 86 is produced at the same instant that the bit read from the unique predetermined address appears on line 28. The stop signal on line 39 is applied to the range logic 37 to stop the range count and produce a range out computation or indication on line 89.

Having explained a preferred embodiment of the present invention, it will be understood that employing a binary random sequence generator 13 which has a remote statistical probability of being decipherable, enhances the present invention for military use. The output spectrum on antenna 19 of the binary random sequence generator 13 is in the low power spectral density range and is difficult to detect. Another advantage of employing low power spectral density is that it does not interfere with other transmissions.

The preferred embodiment explained hereinbefore has preferably employed a 1K by 1 read-write RAM memory and is capable of performing range computations up to 50,000 feet when operated at a fixed clock frequency rate of 30 megahertz. In other applications where longer ranging distances are involved, only the memory 57 needs to be enlarged or extended.

If a more refined ranging resolution is required, the variable frequency clock signal on line 29 and the fixed frequency clock signal on line 12 may be phase compared in range logic 37.

When the unique epoch employed to start the range count is the start of the count sequence, such as all ones or all zeros, the start signal can be produced directly via phantom line 91 to range logic 37. The need for start decode logic 35 can be eliminated. Under these conditions the range of the read address on line 32 which produces the stop signal on line 39 could occur at different times depending on the range being detected.

When the address sequence produced by both read address logic 31 and write address logic 33 is an ordinary counting sequence, and when the unique epoch employed is the all zeros state, the need for start decode logic 35 can be eliminated. Under these conditions the range out on line 89 can be produced simply by latching the write address count within range logic 37 via phantom line 91 at the instant that the stop signal on line 39 occurs. The count thus produced on the range out line 89 is directly proportional to the range being detected.

We claim:

1. A ranging apparatus employing an encoded waveform signal comprising:
   a binary fixed frequency clock,
   a random sequence generator driven by said clock for producing random bits of information in serial form,
   a local oscillator for producing a carrier wave signal,
   a mixer coupled to said local oscillator and said random bits of information for producing a random bit modulated signal,
   transmitter means coupled to said random bit modulated signal,
   receiving means adapted to receive reflected and returned delayed attenuated signals representative of said random bit modulated signals,
   random access memory means of the type having address means, input-output data means and read-write control means,
   a write address counter coupled to said fixed frequency clock and said memory for generating a predetermined sequence of addresses in said memory,
   said random sequence generator being coupled to said memory for supplying said bits of information to the addresses generated by said write address counter,
   code locked loop means for producing a variable frequency signal output,
   said code locked loop means being coupled to said receiving means and to said memory means for comparing the bits of information being read out of memory with the bits of information being received to produce said variable frequency signal output,
   read address counter means coupled to said variable frequency signal output and to said memory for producing the same predetermined sequence of addresses as said write address counter at a time which occurs after said write address counter sequence,
   range computing logic,
   start epoch means coupled to said range computing logic and to said write address counter for producing a signal for starting said range computing logic when a predetermined epoch address is present,
   stop logic means coupled to said range computing logic and to said read address counter for producing a signal for stopping said range computing logic when the same predetermined epoch address is present at a subsequent time, and
   said read-write control means including means for alternately reading and writing bits of information from and to said memory at the addresses designated by the read address counter and the write address counter.

2. A ranging apparatus as set forth in claim 1 wherein said read-write control means is adapted to read over a longer time period than it is adapted to write.

3. A ranging apparatus as set forth in claim 1 wherein said random access memory means comprises a solid state random access memory chip and a multiplexer.

4. A ranging apparatus as set forth in claim 3 wherein said random access memory means further comprises first delay means coupled to the output of said random access memory chip.

5. A ranging apparatus as set forth in claim 4 which further includes second delay means coupled to said first said delay means and having an output coupled to said code locked loop means.

6. A ranging apparatus as set forth in claim 5 which further includes sequencer means coupled to said first and second delay means for alternately shifting information through said delay means.

7. A ranging apparatus as set forth in claim 5 wherein said first and second delay means comprise shift registers.

* * * * *